United States Patent [19]

Ogawa et al.

[11] Patent Number: 4,857,388
[45] Date of Patent: Aug. 15, 1989

[54] MAGNETIC RECORDING MEDIUM

[75] Inventors: Hiroshi Ogawa; Yasuo Tamai, both of Kanagawa, Japan

[73] Assignee: Fuji Photo Film Co., Ltd., Kanagawa, Japan

[21] Appl. No.: 110,296

[22] Filed: Oct. 20, 1987

[30] Foreign Application Priority Data

Oct. 20, 1986 [JP] Japan .................. 61-248858

[51] Int. Cl.$^4$ .................. G11B 5/70
[52] U.S. Cl. .................. 428/212; 427/131; 428/336; 428/694; 428/900
[58] Field of Search .......... 428/212, 694, 900, 336; 427/131

[56] References Cited

U.S. PATENT DOCUMENTS

| 4,187,341 | 2/1980 | Suzuki et al. | 428/900 |
| 4,246,316 | 1/1981 | Aonuma et al. | 427/131 |
| 4,316,927 | 2/1982 | Kimura et al. | 428/694 |
| 4,318,957 | 3/1982 | Videc | 428/694 |
| 4,410,590 | 10/1983 | Kawahara et al. | 428/694 |
| 4,624,883 | 11/1986 | Yamaguchi et al. | 427/131 |

Primary Examiner—Paul J. Thibodeau
Attorney, Agent, or Firm—Sughrue, Mion, Zinn, Macpeak & Seas

[57] ABSTRACT

A magnetic recording medium comprises a nonmagnetic support and a magnetic recording layer provided on the support which comprises two layers including a first magnetic recording layer and a second magnetic recording layer. Each of the two magnetic recording layers contains a ferromagnetic powder having a coercive force of not less than 500 Oe dispersed therein. The first magnetic recording layer is provided on the support has a Young's modulus of 500 to 1,000 kg/mm$^2$; and the second magnetic recording layer provided on the first magnetic recording layer has a Young's modulus of not less than 1,300 kg/mm$^2$; and the magnetic recording layers as a whole show a Young's modulus of not less than 900 kg/mm$^2$.

7 Claims, 1 Drawing Sheet

F I G. 1
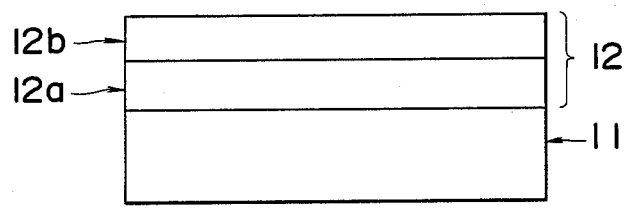

MAGNETIC RECORDING MEDIUM

BACKGROUND OF THE INVENTION

1. Field of the Invention

The present invention relates to a magnetic recording medium which is improved in electromagnetic conversion characteristics, running property and running endurance.

2. Description of Prior Art

Magnetic recording media have been widely employed in recent years as an audio tape, a video tape or a magnetic tape for a computer system. The magnetic recording medium is desired to be excellent in various properties such as electromagnetic conversion characteristics, running property and running endurance.

For enhancing the electromagnetic conversion characteristics of the medium, for example, a method of improving a coercive force (Hc) of a ferromagnetic powder to be employed has been utilized, and recently a ferromagnetic powder having a coercive force of not less than 500 Oe is generally employed.

Further, a magnetic recording medium such as an audio tape or a video tape has been broadly used in the form of a cassette encasing the tape therein. In the case of such tape encased in a cassette (i.e., cassette tape), a demand for longer time recording has increased, and hence the tape is apt be made thinner. A magnetic recording medium generally comprises a nonmagnetic support and a magnetic recording layer provided on the support, so that it is thought that the thickness of the magnetic recording layer is made smaller for the purpose of making the magnetic recording medium as a whole thinner. However, if the thickness of the magnetic recording layer is made smaller, an adverse effect is given to the electromagnetic conversion characteristics of the resulting medium. Accordingly, the thickness of the nonmagnetic support is generally made smaller for that purpose.

The nonmagnetic support functions not only to give a mechanical or physical strength to the magnetic recording medium in the longitudinal and width directions but also to absorb a shock caused by a pressure applied to the recording medium in the depth direction. That is, the nonmagnetic support absorbs a shock given to the magnetic recording layer when the recording layer is brought into contact with a magnetic head, whereby the recording layer is prevented from suffering damages caused by the contact with a magnetic head. For this reason, as the thickness of the nonmagnetic support is made smaller, the function of shock absorption of the nonmagnetic support decreases. Especially in recent days, it is required for a thin nonmagnetic support to provide a high strength to the magnetic recording medium, so that a resin film having high mechanical or physical strength is widely employed. However, such resin film is generally rigid, and hence the nonmagnetic support of such resin film is liable to be decreased in the above-mentioned function of shock absorption.

By the decrease of the function of shock absorption of the nonmagnetic support, there arises a problem that a ferromagnetic powder easily separates (drops off) from the magnetic recording layer to deposit on a magnetic head when the recording layer is brought into contact with the head, whereby running endurance of the recording medium is deteriorated.

A magnetic recording medium having a recording layer in the form of two layers has been already known, and the known magnetic recording layer of two-layer type generally comprises a flexible (soft) upper layer and a lower layer of high hardness. That is, in the magnetic recording medium having such structure, the upper layer of the magnetic recording layer which is to be in contact with a magnetic head is made flexible, and thereby the magnetic recording layer can be enhanced in easiness of close contact with the head.

However, it has been confirmed by the present inventors that the above-mentioned magnetic recording medium having a two-layer type magnetic recording layer including the upper flexible layer and the lower layer of high hardness decreases in running property and running endurance, and additionally the recording medium shows poor bonding strength between the nonmagnetic support and the magnetic recording layer. Also confirmed is that a magnetic tape having such constitution of the magnetic recording layer shows an extreme variation of electromagnetic conversion characteristics (i.e., variation of output level) when stored under condition of high temperatures such as a temperature of higher than 60° C. It is presumed that the variation of electromagnetic conversion characteristics in the storage at high temperatures takes place for the following reason. When the magnetic tape is stored in the wound state at a high temperature, the upper layer of the magnetic recording layer is made more soft by the high temperature, and the protruded and depressed portions of the surface of the nonmagnetic support of the magnetic tape are copied onto the surface of the upper layer of the magnetic recording layer. As a result, electromagnetic conversion characteristics of the medium varies in the reproduction procedure.

Japanese Patent Provisional Publication No. 57(1982)-78630 discloses a magnetic recording medium comprising two magnetic recording layers in which the orientations of the ferromagnetic powders contained in the two recording layers are made different from each other, whereby the ratio of the elasticity modulus between in the longitudinal direction and in the width direction of the medium is in the specific range. The magnetic recording medium is improved in strength particularly in the edge portion. However, the recording medium is not improved as far as the electromagnetic conversion characteristics, running property and running endurance are concerned.

SUMMARY OF THE INVENTION

It is an object of the present invention to provide a magnetic recording medium such as a magnetic tape which is improved in electromagnetic conversion characteristics, running property and running endurance.

More particularly, the object of the invention is to provide a magnetic recording medium less suffering clogging on a magnetic head and showing high running endurance.

There is provided by the present invention a magnetic recording medium comprising a nonmagnetic support and a magnetic recording layer provided on the support which comprises two layers including a first magnetic recording layer and a second magnetic recording layer, each of said first and second magnetic recording layers comprising a binder and a ferromagnetic powder having a coercive force of not less than 500 Oe dispersed therein, wherein:

said first magnetic recording layer provided on the nonmagnetic support has a Young's modulus in the longitudinal direction of 500 to 1,000 kg/mm$^2$;

said second magnetic recording layer provided on the first magnetic recording layer has a Young's modulus of not less than 1,300 kg/mm$^2$; and the magnetic recording layers as a whole show a Young's modulus in the longitudinal direction of not less than 900 kg/mm$^2$.

In the magnetic recording medium of the present invention, the first magnetic recording layer provided on the nonmagnetic support effectively functions to absorb a shock caused by a pressure applied to the recording layer because it is made highly flexible. For example, the first magnetic recording layer absorbs a shock given to the magnetic recording medium when the surface of magnetic recording layer is brought into contact with a magnetic head, and hence the occurrence of damages on the magnetic recording layer is prominently reduced. Moreover, since the ferromagnetic powder hardly separates (drops off) from the magnetic recording layer so as not to deposit onto the magnetic head, the running endurance of the recording medium is improved. Further, the second magnetic recording layer, the surface of which is brought into contact with a magnetic head, is made rigid, so that the recording layer hardly suffers from abrasion or distortion (deformation) even when the recording layer is in contact with the head, and the ferromagnetic powder does not easily drop off from the recording layer.

In addition to the above-mentioned favorable features, the magnetic recording medium of the invention is hardly deformed even when stored in an atmosphere of high temperatures, and accordingly copying of the protruded and depressed portions of the nonmagnetic support onto the surface of the magnetic recording layer is prominently reduced in the storage of the medium in the wound state.

BRIEF DESCRIPTION OF DRAWINGS

FIG. 1 is a sectional view showing a constitution of a magnetic recording medium according to the present invention.

DETAILED DESCRIPTION OF THE INVENTION

As shown in FIG. 1 of the attached drawing, the magnetic recording medium of the present invention basically comprises a nonmagnetic support 11 and a magnetic recording layer 12 provided on the surface of the support. The magnetic recording layer 12 consists of the first magnetic recording layer 12a and the second magnetic recording layer 12b, each having a specific Young's modulus which is different from each other.

A conventional magnetic recording medium is generally prepared by a method of providing a magnetic recording layer on the nonmagnetic support in the form of sheet or film through a coating method, and the magnetic recording medium of the invention can be also prepared utilizing the known method.

For obtaining the specific Young's modulus of each of the first and second magnetic recording layers defined in the invention, there can be utilized various methods such as a method of using substantially the same ferromagnetic powders for both layers (e.g., Co-containing γ-iron oxide, but their surface area or coercive force may be different from each other) in the same amounts and using a binder of the first magnetic recording layer which has a Young's modulus lower than that of the binder of the second magnetic recording layer; a method of using the same binders in both layers and using a ferromagnetic powder in the first magnetic recording layer in an amount smaller than that in the second magnetic recording layer; and a method of adjusting both of the amounts of the ferromagnetic powders and the kinds of the binders for the first and second magnetic recording layers so as to determine the Young's moduli of those layers.

A process for the preparation of a magnetic recording medium of the invention which is specified in the Young's moduli of the first and second magnetic recording layers will be described hereinafter, referring to the above-mentioned method using the same ferromagnetic powders in the same amounts and using a binder of the first magnetic recording layer which has a Young's modulus lower than that of the binder of the second magnetic recording layer.

Examples of materials of the nonmagnetic support include polyester resins, polyolefin resins, cellulose derivatives, polycarbonate resins, polyamide resins, polyimide resins and polyamideimide resins. There can be also employed other materials depending on the purpose such as films of nonmagnetic metals (e.g., aluminum, copper, tin, zinc and a nonmagnetic metal containing thereof), plastic films deposited with a metal such as aluminum, and various papers (e.g., an ordinary paper and papers coated or laminated with polyolefins).

There is no specific limitation on the shape of the nonmagnetic support, and any shape (form) such as sheet, film, tape, disc, card and drum can be employed. Generally employed is a nommagnetic support in the form of a sheet.

In the case of using a nonmagnetic support in the form of a sheet, the thickness of the support is generally in the range of 5 to 50 μm.

The nonmagnetic support may have a back layer (or backing layer) on the opposite side of the side where a magnetic recording layer is to be coated.

On the nonmagnetic support, a magnetic recording layer is provided. The magnetic recording layer comprises a ferromagnetic powder having a coercive force of not less than 500 Oe dispersed in a binder.

As the ferromagnetic powder having a coercive force of not less than 500 Oe, there can be mentioned a ferromagnetic powder of Co-containing iron oxide, a ferromagnetic powder of chromium dioxide, a ferromagnetic metal powder and barium ferrite.

The ferromagnetic powder generally used is in a needle shape, and the needle ratio thereof is preferably in the range of 2/1 to 20/1, more preferably in the range of 5/1 to 20/1. The average length of the ferromagnetic powder is in the range of 0.2 to 2.0 μm. The shape of the ferromagnetic powder is by no means restricted to the needle shape, and any other shapes conventionally used such as rice shape or plate shape can be also employed in the invention.

In the invention, it is particularly preferred to use a ferromagnetic powder having a coercive force of not less than 500 Oe and having a specific surface area of not less than 42 m$^2$/g (preferably not less than 50 m$^2$/g).

In the case of using a ferromagnetic metal powder, preferred is a ferromagnetic alloy powder containing a metal component in which at least 75 wt.% (preferably at least 80 wt.%) of the metal component comprises at least one ferromagnetic metal or metal alloy (e.g., Fe, Co, Ni, Fe-Co, Fe-Ni, Co-Ni or Fe-Co-Ni) and having a longitudinal diameter of not more than 1.0 μm.

As the binder employable for the magnetic recording layer according to the invention, there can be mentioned those conventionally used for the formation of a magnetic recording layer such as thermoplastic resins, thermosetting resins and reaction curing resins.

Examples of the thermoplastic resins include vinyl chloride/vinyl acetate/maleic anhydride copolymer resins, vinyl chloride/vinyl acetate copolymer resins, cellulose derivatives, vinylidene chloride resins, polyester resins, (meth)acrylic resins, polyvinyl acetal resins, polyvinyl butyral resins, butadiene/acrylonitrile copolymer resins, polyamide resins, polyvinyl fluoride resins and nylon/silicone resins. The thermoplastic resin employable in the invention has a softening temperature of not higher than 150° C. and an average molecular weight of 10,000 to 200,000.

Examples of the thermosetting resins and reaction curing resins include polyurethane resins, urea resins, melamine resins, phenoxy resins, epoxy resins, urethane epoxy resins, a mixture of polyester polyol and polyisocyanate, urea/formaldehyde resins, polyamide resins and a mixture of low molecular glycol, high molecular diol and triphenylmethane triisocyanate. The thermosetting resin or reaction curing resin employable in the invention has a molecular weight of not more than 200,000 before it is cured and a molecular weight of almost infinity after curing reaction.

The above-mentioned resins can be employed independently or in combination as the binder.

The binder used in the first magnetic recording layer is selected from those having a Young's modulus lower than that of the binder used for the second magnetic recording layer.

As the binder of the second magnetic recording layer, a combination of a vinyl chloride/vinyl acetate/maleic anhydride copolymer and a polyurethane resin is particularly preferred. In this case (i.e., the case of using such combination), a polyisocyanate compound is preferably used as a curing agent together with the combination, whereby the resulting second magnetic recording layer is enhanced in hardness, and hence the surface of the magnetic recording layer can be prevented from separation or dropping of the ferromagnetic powder which is caused by the contact between the surface of the magnetic recording layer and a magnetic head. As a result, the resulting recording medium is further improved in running endurance.

When the above-mentioned vinyl chloride/vinyl acetate/maleic anhydride copolymer, polyurethane resin and polyisocyanate compound are employed in combination as the binder of the second magnetic recording layer, the ratio between the vinyl chloride/vinyl acetate/maleic anhydride copolymer and the polyurethane resin is preferably in the range of 1:0.1 to 1:1 (vinyl chloride/vinyl acetate/maleic anhydride copolymer:polyurethane resin, by weight), and the ratio between the polyurethane resin and the polyisocyanate compound is preferably in the range of 1:1 to 1:3 (polyurethane resin:polyisocyanate compound, by weight). The amount of the polyurethane resin contained in the binder of the second magnetic recording layer is preferably smaller than 50 wt.%, more preferably not larger than 30 wt.%. In the case of not larger than 30 wt.%, the Young's modulus of the second magnetic recording layer increases, and thereby occurrence of separation or dropping of the ferromagnetic powder from the surface of the second magnetic recording layer can be much more reduced even when the surface of the magnetic recording layer is brought into contact with a magnetic head.

As the binder of the first magnetic recording layer, there can be mentioned resin components (including resin composition) inherently having a low Young's modulus among the aforementioned resin components. Examples of the binder of the first magnetic recording layer include a polyurethane resin and a saturated polyester resin. They can be employed singly or in combination. In the case of using the polyurethane resin, a small amount of a polyisocyanate compound can be used in combination as a curing agent.

When the polyurethane resin is used as a binder component of the first magnetic recording layer, the binder of the first magnetic recording layer preferably contains the polyurethane resin in an amount of not smaller than 50 wt.%, more preferably not smaller than 60 wt.%. The polyurethane resin is inherently soft, so that especially when the polyurethane resin is used in an amount of not smaller than 60 wt.%, the Young's modulus of the first magnetic recording layer decreases, whereby the first magnetic recording layer favorably functions to effectively absorb a shock.

The amount of the binder contained in each of the first and second magnetic recording layers is generally in the range of 15 to 45 parts by weight based on 100 parts by weight of the ferromagnetic powder contained in each layer.

Both of the first and second magnetic recording layers may contain other additives conventionally used such as a lubricant, an abrasive, a dispersing agent, an antistatic agent and a corrosion inhibitor. Examples of the lubricant employable in the invention include saturated or unsaturated higher fatty acid, fatty acid ester, higher fatty acid amide, higher alcohol, silicon oil, mineral oil, vegetable oil, fluorine compound, and a solid lubricant such as graphite.

The magnetic recording medium of the present invention can be prepared, for example, by the following process.

In the first place, a magnetic paint for the formation of the first magnetic recording layer (referred to hereinafter as "first magnetic paint") and a magnetic paint for the formation of the second magnetic recording layer (referred to hereinafter as "second magnetic paint") are prepared by a known method using the components for the formation of those magnetic recording layers containing a ferromagnetic powder having a coercive force of not less than 500 Oe and a binder as the host components. The components for the formation of those magnetic recording layers may also contain other additives such as a lubricant, an abrasive, a dispersing agent, an antistatic agent and a corrosion inhibitor, if desired. In the preparation of the first and second magnetic paints, the same kind of ferromagnetic powders are used in the same amounts for those magnetic paints, and as the binder of the first magnetic paint, a binder having a Young's modulus lower than that of the binder of the second magnetic paint is employed.

In the second place, the first and second magnetic paints prepared as above are coated in such a manner that the first magnetic paint and the second magnetic paint are arranged on the nonmagnetic support in this order, so as to form a magnetic recording layer comprising the first and second magnetic layers on the support. Thus, a magnetic recording medium of the present invention can be prepared.

In the coating procedure, the first magnetic paint having a relatively lower Young's modulus is coated on the nonmagnetic support, and then the second magnetic paint having a relatively higher Young's modulus is coated on the coated layer of the first magnetic paint.

The coating procedure can be carried out by coating the first magnetic paint on the nonmagnetic support and then coating the second magnetic paint on the coated layer of the first magnetic paint. Otherwise, it is also possible to simultaneously apply those first and second magnetic paints on the nonmagnetic support in the superposed form by the use of a simultaneous superposition coating machine.

The coating procedure is performed in such a manner that whole thickness of the resulting magnetic recording layer of the magnetic recording medium would be in the range of 2.0 to 10 $\mu$m. Accordingly, in the case of utilizing a simultaneous superposition coating, each layer of the first and second magnetic paints is generally determined based on half thickness of the above-defined thickness. For the purpose of preventing the aforementioned transferring in the long-term storage of a magnetic recording medium, it is desired that the thickness of the second magnetic recording layer is not larger than 2 $\mu$m and the thickness of the first magnetic recording layer is larger than that of the second magnetic recording layer.

The coated layers of the magnetic paints are generally subjected a magnetic orientation under wet condition so as to orient the ferromagnetic powder contained in the magnetic recording layer.

Then, the coated layers of the magnetic paints are subjected to a drying process to give a magnetic recording layer. The drying process is generally carried out by heating the coated layers at a temperature of 50° to 120° C. for 10 second to 5 minutes.

After the coated is dried, the surface of the magnetic recording layer is subjected to a surface smoothening process, and then the resulting sheet comprising a magnetic recording layer and a nonmagnetic support is cut or slit into a desired shape.

Thus, there can be prepared a magnetic recording medium of the invention in which a Young's modulus of the first magnetic recording layer is 500 to 1,000 kg/mm$^2$, a Young's modulus of the second magnetic recording layer provided on the first magnetic recording layer is not less than 1,300 kg/mm$^2$, and a Young's modulus of the whole of the magnetic recording layer is not less than 900 kg/mm$^2$.

In the case of forming each of the first and second magnetic recording layers by adjusting the amounts of the ferromagnetic powders for those layers, a process according to the above-described one can be utilized.

The examples and the comparison examples of the present invention are given below. In the following examples, the term "part(s)" means "part(s) by weight", unless otherwise specified.

PREPARATION OF MAGNETIC PAINT

A ferromagnetic powder, binder components (excluding a polyisocyanate compound), additives and a solvent set forth in each of the following three kinds of compositions (Composition X, Y and Z) for magnetic paints were well kneaded in a ball mill to give a mixture. To the mixture was added a polyisocyanate compound indicated in the following binder components and they were sufficiently kneaded to prepare three kinds of magnetic paints. The amounts of the binder components used in the preparation of a magnetic paint are set forth in each example.

Composition X

Ferromagnetic Powder

Co-containing $\gamma$-FeO$_x$ (x=1.45, Hc: 650 Oe, specific surface area: 30 m$^2$/g) 100 parts Binder Components Vinyl chloride/vinyl acetate/vinyl alcohol copolymer (copolymerization ratio=92:2:6, degree of polymerization: 400)

Polyester polyurethane resin (molecular weight: 50,000)

Polyisocyanate compound (Desmodule L-75, available from Bayer AG)

Additives

Myristic acid: 2 parts
Oleic acid modified silicon: 2 parts

Solvent

Methyl ethyl ketone: 300 parts

Composition Y

Ferromagnetic Powder

Co-containing $\gamma$-FeO$_x$ (x=1.45, Hc: 650 Oe, specific surface area: 40 m$^2$/g): 100 parts Binder Components Vinyl chloride/vinyl acetate/vinyl alcohol copolymer (copolymerization ratio=92:2:6, degree of polymerization: 400)

Polyester polyurethane resin (molecular weight: 50,000)

Additives

Myristic acid: 2 parts
Oleic acid modified silicon: 2 parts
$\alpha$-Alumina: 0.5 part
Conductive carbon: 0.5 part Solvent Methyl ethyl ketone 300 parts Composition Z Ferromagnetic Powder Co-containing $\gamma$-FeO$_x$ (x=1.45, Hc: 650 Oe, specific surface area: 50 m$^2$/g): 100 parts Binder Components Vinyl chloride/vinyl acetate/vinyl alcohol copolymer (copolymerization ratio=92:2:6, degree of polymerization: 400)

Polyester polyurethane resin (molecular weight: 50,000)

Polyisocyanate compound
(Desmodule L-75, available from Bayer AG)

Additives

Stearic acid: 1 part
Butyl stearate: 7 parts
$\alpha$-Alumina: 2 parts
Conductive carbon: 2 parts Solvent Methyl ethyl ketone: 300 parts

EXAMPLE 1

The amounts of the vinyl chloride/vinyl acetate/vinyl alcohol copolymer, polyester polyurethane resin and the polyisocyanate compound in Composition X were set to 9 parts, 15 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer and the polyester polyurethane resin in Composition Y were set to 27 parts and 3 parts, respectively, to prepare a magnetic paint (i.e., second magnetic paint) according to the above-mentioned procedure.

The first and second magnetic paints obtained as above were simultaneously coated over a polyethylene terephthalate support of 10 μm thick in the superposed form, to give a coated layer of the first magnetic paint having thickness of 4 μm (in dry basis) on the support and a coated layer of the second magnetic paint having thickness of 1 μm (in dry basis) on the coated layer of the first magnetic paint. The support with the coated layers was subjected to a magnetic orientation while the coated layers were wet, and then heated at a temperature of 100° C. for one minute to remove the solvent.

After the drying, the resulting sheet was subjected to a surface smoothening treatment by means of a calender roll and further subjected to another heat treatment. The sheet was then slit to give an audio compact cassette tape (audio tape) having a width of 3.8 mm.

EXAMPLE 2

The amounts of the vinyl chloride/vinyl acetate/vinyl alcohol copolymer, polyester polyurethane resin and the polyisocyanate compound in Composition X were set to 9 parts, 15 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer and the polyester polyurethane resin in Composition Y were set to 24 parts and 6 parts, respectively, to prepare a magnetic paint (i.e., second magnetic paint) according to the above-mentioned -

Using the obtained first and second magnetic paints, an audio compact cassette tape was prepared in the same manner as described in Example 1.

EXAMPLE 3

The procedure of Example 1 was repeated except for varying the thickness of the coated layers of the second magnetic paint and the first magnetic paint to 2 μm and 3 μm (both in dry basis), respectively, to prepare an audio compact cassette tape.

EXAMPLE 4

The amounts of the vinyl chloride/vinyl acetate/vinyl alcohol copolymer, polyester polyurethane resin and the polyisocyanate compound in Composition X were set to 9 parts, 15 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer and the polyester polyurethane resin in Composition Y were set to 30 parts and 0 part, respectively, to prepare a magnetic paint (i.e., second magnetic paint) according to the above-mentioned procedure.

Using the obtained first and second magnetic paints, an audio compact cassette tape was prepared in the same manner as described in Example 1.

COMPARISON EXAMPLE 1

The amounts of the vinyl chloride/vinyl acetate/vinyl alcohol copolymer, polyester polyurethane resin and the polyisocyanate compound in Composition X were set to 9 parts, 15 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer and the polyester polyurethane resin in Composition Y were set to 21 parts and 9 parts, respectively, to prepare a magnetic paint (i.e., second magnetic paint) according to the above-mentioned procedure.

Using the obtained first and second magnetic paints, an audio compact cassette tape was prepared in the same manner as described in Example 1.

COMPARISON EXAMPLE 2

The amounts of the vinyl chloride/vinyl acetate/vinyl alcohol copolymer, polyester polyurethane resin and the polyisocyanate compound in Composition X were set to 15 parts, 9 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer and the polyester polyurethane resin in Composition Y were set to 27 parts and 3 parts, respectively, to prepare a magnetic paint (i.e., second magnetic paint) according to the above-mentioned procedure.

Using the obtained first and second magnetic paints, an audio compact cassette tape was prepared in the same manner as described in Example 1.

The audio compact cassette tapes prepared in Examples 1 to 4 and Comparison Examples 1 and 2 were measured on Young's moduli of an upper layer of the magnetic recording layer (i.e., first magnetic recording layer), a lower layer of the magnetic recording layer (i.e., second magnetic recording layer) and the whole of the magnetic recording layer by means of a viscoelasticity spectrometer (produced by Toyo Baldwin Co., Ltd.). The results are set forth in Table 1.

The audio tapes were further evaluated on variation of output level, running property, tape squeak, and easiness in close contact with a magnetic head (i.e., contact property) according to the following tests. The results are also set forth in Table 1.

Variation of output level

The audio tape was recorded with a signal of 10 KHz and −10 dB. The tape was then wound over a hub and kept in an atmosphere of 80° C. for 24 hours. The tape was taken out of the atmosphere and placed under ambient conditions for one hour. The signal was then reproduced for determining variation of the output level.

The results of the evaluation are classified into the following:

A: variation of output level of not more than 1 dB;

B: variation of output level of more than 1 dB to not more than 3 dB;

C: variation of output level of more than 3 dB to not more than 6 dB; and

D: variation of output level of more than 6 dB.

Running property 100 audio tapes (for each example) were allowed to stand in an atmosphere of 80° C. for 24 hours, and then taken out of the atmosphere and placed under ambient conditions for one hour. The audio tapes were repeatedly run in 100 commercially available tape recorders at 20 times of round-trip, to count the number of tapes in which tape-running stop took place.

The results of the evaluation are classified into the following:

A: tape-running stop does not take place on any tape;
B: tape-running stop takes place on one tape;
C: tape-running stop takes place on two tapes; and
D: tape running stop takes place on three or more tapes.

Tape squeak

In the above-mentioned test for evaluating the running property, the number of tapes in which tape squeak took place was counted.

The results of the evaluation are classified into the following:

A: tape squeak does not take place on any tape;
B: tape squeak takes place on one tape;
C: tape squeak takes place on two tapes; and
D: tape squeak takes place on three or more tapes.

Contact property

The contact property of the audio tape with a magnetic head was evaluated by examining a bonding strength between the magnetic recording layer and the nonmagnetic support according to a T-peel test. The evaluation was made by measuring a tension required for peeling (separating) the magnetic recording layer from the support.

The results of the evaluation are classified into the following:

A: tension of not less than 50 g.;
B: tension of 35 to 45 g.;
C: tension of 20 to 34 g.; and
D: tension of not more than 19 g.

TABLE 1

|  | Example | | | | Com. Example | |
| --- | --- | --- | --- | --- | --- | --- |
|  | 1 | 2 | 3 | 4 | 1 | 2 |
| Young's modulus (Oe) | | | | | | |
| Upper layer | 1,700 | 1,400 | 1,700 | 1,900 | 1,000 | 1,700 |
| Lower layer | 800 | 800 | 800 | 800 | 800 | 1,100 |
| Whole layer | 980 | 920 | 1,160 | 1,020 | 840 | 1,220 |
| Variation of output level | A | A | A | A | C | A |
| Running property | A | A | A | A | B | B |
| Tape squeak | A | A | A | A | B | A |
| Contact property | A | A | B | A | A | C |

EXAMPLE 5

The amounts of the vinyl chloride/vinyl acetate/vinyl alcohol copolymer, polyester polyurethane and the polyisocyanate in Composition X were set to 9 parts, 15 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer, polyester polyurethane resin and the polyisocyanate compound in Composition Z were set to 12 parts, 7.5 parts and 10.5 parts, respectively, to prepare a magnetic paint (i.e., second magnetic paint) according to the above-mentioned procedure.

The first and second magnetic paints obtained as above were simultaneously coated over a polyethylene terephthalate support of 10 μm thick in the superposed form, to give a coated layer of the first magnetic paint having thickness of 4 μm (on dry basis) on the support and a coated layer of the second magnetic paint having thickness of 1 μm (in dry basis) on the coated layer of the first magnetic paint. The support with the coated layers was subjected to a magnetic orientation while the coated layers were wet, and then heated at a temperature of 100° C. for one minute to remove the solvent.

After the coated layer was dried, the resulting sheet was subjected to a surface smoothening treatment by means of a calender roll and further subjected to another heat treatment. The sheet was then slit to give a VHS type video cassette tape (video tape) having a width of ½ inch.

COMPARISON EXAMPLE 3

The amounts of the vinyl chloride/vinyl acetate/vinyl alcohol copolymer, polyester polyurethane resin and the polyisocyanate compound in Composition X were set to 9 parts, 15 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer, polyester polyurethane resin and the polyisocyanate compound in Composition Z were set to 9 parts, 15 parts and 6 parts, respectively, to prepare a magnetic paint (i.e., second magnetic paint) according to the above-mentioned procedure.

Using the obtained first and second magnetic paints, a VHS type video cassette tape was prepared in the same manner as described in Example 5.

COMPARISON EXAMPLE 4

The amounts of the vinyl chloride/vinyl acetate/vinyl alcohol copolymer, polyester polurethane resin and the polyisocyanate compound in Composition X were set to 15 parts, 9 parts and 6 parts, respectively, to prepare a magnetic paint (i.e., first magnetic paint) according to the above-mentioned procedure.

Independently, the amounts of the vinyl chloride/vinyl acetate/vinyl alcohol copolymer, polyester polyurethane resin and the polyisocyanate compound in Composition Z were set to 12 parts, 7.5 parts and 10.5 parts, respectively, to prepare a magnetic paint (i.e., second magnetic paint) according to the aforementioned procedure.

Using the obtained first and second magnetic paints, a VHS type video cassette tape was prepared in the same manner as described in Example 5.

The video cassette tapes prepared in Example 5 and Comparison Examples 3 and 4 were measured on Young's moduli of an upper layer of the magnetic recording layer (i.e., first magnetic recording layer), a lower layer of the magnetic recording layer (i.e., second magnetic recording layer) and the whole of the magnetic recording layer by means of a viscoelasticity spectrometer (produced by Toyo Baldwin Co., Ltd.). The results are set forth in Table 2.

The video tapes were further evaluated on still life and easiness in close contact with a magnetic head (i.e., contact property) according to the following tests. The results are also set forth in Table 2.

Still life

The video tape was run in a commercially available VHS type video tape recorder under a still mode to determine a term (i.e., still life) at the end of which the video output decreased by 6 dB. The results of the evaluation are classified into the following:

A: still life of not shorter than 120 minutes;
B: still life of not shorter than 60 minutes and shorter than 120 minutes;
C: still life of not shorter than 30 minutes and shorter than 60 minutes; and
D: still life of shorter than 30 minutes.

Contact property

The contact property of the video tape with a magnetic head was evaluated by examining a bonding strength between the magnetic recording layer and the nonmagnetic support according to a T-peel test. The evaluation was made by measuring a tension required for peeling (separating) the magnetic recording layer from the support.

The results of the evaluation are classified into the following:

A: tension of not less than 50 g.;
B: tension of 35 to 45 g.;
C: tension of 20 to 34 g.; and
D: tension of not more than 19 g.

TABLE 2

| | Young's Modulus (Oe) | | | Still Life | Contact Property |
|---|---|---|---|---|---|
| | Upper layer | Lower layer | Whole layer | | |
| Example 5 | 1,500 | 800 | 940 | A | A |
| Com. Ex. 3 | 800 | 800 | 800 | C | A |
| Com. Ex. 4 | 1,500 | 1,100 | 1,180 | A | C |

We claim:

1. A magnetic recording tape comprising a nonmagnetic support and a magnetic recording layer provided on the support which comprises two layers including a first magnetic recording layer and a second magnetic recording layer, each of said first and second magnetic recording layers comprising a binder and a ferromagnetic powder having a coercive force of not less than 500 Oe dispersed therein, wherein:

said first magnetic recording layer provided on the nonmagnetic support has a Young's modulus in the longitudinal direction of 500 to 1,000 kg/mm$^2$;

said second magnetic recording layer provided on the first magnetic recording layer has a Young's modulus in the longitudinal direction of not less than 1,300 kg/mm$^2$; and the magnetic recording layers as a whole show a Young's modulus in the longitudinal direction of not less than 900 kg/mm$^2$.

2. The magnetic recording tape as claimed in claim 1, wherein said each of the binders of the first and second magnetic recording layers contains a vinyl chloride copolymer and a polyurethane resin.

3. The magnetic recording tape as claimed in claim 1, wherein the total thickness of the first magnetic recording layer and the second magnetic recording layer is in the range of 2 to 10 μm.

4. The magnetic recording tape as claimed in claim 1, wherein the thickness of the second magnetic recording layer is not larger than 2 μm, and the thickness of the first magnetic recording layer is larger than that of the second magnetic recording layer.

5. The magnetic recording tape as claimed in claim 1, wherein the binder of the first magnetic recording layer contains a polyurethane resin in an amount of not less than 60 wt.%.

6. The magnetic recording tape as claimed in claim 1, wherein the binder of the first magnetic recording layer contains a vinyl chloride copolymer and a polyurethane resin, the amount of the polyurethane being not less than 60 wt.% of the total binder.

7. The magnetic recording tape as claimed in claim 1, wherein the ferromagnetic powder of the first and second magnetic recording layers are Co-containing γ-magnetic powder.

* * * * *